United States Patent [19]

Parker et al.

[11] Patent Number: 4,945,731
[45] Date of Patent: Aug. 7, 1990

[54] ABSORBING FLUID RECEIVER FOR SOLAR DYNAMIC POWER GENERATION AND SOLAR DYNAMIC POWER SYSTEM

[76] Inventors: Robin Z. Parker, 1608 Tigertail Ave., Miami, Fla. 33133; Peter W. Langhoff, 4890 Verness Woods Rd., Bloomington, Ind. 47401; Edward J. Bair, 117 North Hilsdale Ave., Bloomington, Ind. 47401

[21] Appl. No.: 282,735

[22] Filed: Dec. 12, 1988

[51] Int. Cl.$^5$ ............................ F03G 7/02; F02C 1/04
[52] U.S. Cl. ................................ 60/641.15; 60/641.8; 60/659; 60/669; 60/682; 60/641.14
[58] Field of Search ............. 60/641.8, 641.13, 641.14, 60/641.15, 659, 669, 650, 682

[56] References Cited

U.S. PATENT DOCUMENTS

| | | | |
|---|---|---|---|
| 2,968,916 | 1/1961 | Taylor et al. | 60/641.8 |
| 3,349,247 | 10/1967 | Birkestrand | 60/669 X |
| 3,977,197 | 8/1976 | Brantley, Jr. | 60/659 |
| 4,033,118 | 7/1977 | Powell | 60/659 X |
| 4,069,673 | 1/1978 | Lapeyre | 60/669 X |

*Primary Examiner*—Allen M. Ostrager
*Attorney, Agent, or Firm*—Cushman, Darby & Cushman

[57] ABSTRACT

A receiver is described for a solar dynamic power generator. The generator has a heat cycle engine to generate power. The receiver has a working fluid including a radiant eneryg absorber selected from halogens and interhalogens. The receiver also has a hollow, cylindrical containment for containing the working fluid having a first end, a second end and an inner wall. A hollow, cylindrical member, is disposed within the containment. The cylindrical member has an inner wall an and outer wall, and defines a toroidal working fluid flow space within the containment and a receiving space within the inner wall of the cylindrical member. A window is disposed in the first end of the containment for admitting solar radiation in the receiving space and heating working fluid contained in the receiving space. The heated working fluid in the receiving space travels toward the first end of the containment. A latent heat storing material is disposed in the flow space between the outer wall of the cylindrical member and the inner wall of the containment for storing heat absorbed by the working fluid in the receiving space. Means are provided for coupling the working fluid with a heat engine, wherein, at the end of the heat cycle, the working fluid is reintroduced into the receiving space toward the second end of the containment.

15 Claims, 2 Drawing Sheets

ABSORBING FLUID RECEIVER FOR SOLAR DYNAMIC POWER GENERATION AND SOLAR DYNAMIC POWER SYSTEM

BACKGROUND OF THE INVENTION

The present invention relates to a solar dynamic power system and a process for converting solar radiant power to electrical power. It relates specifically to a solar radiation receiver in which a large fraction of the radiation is absorbed directly by the working fluid of a heat engine. This creates new possibilities for increasing the fraction of the solar radiant power that is converted into electrical power. It also creates the possibility of simplifying the system architecture in ways that have numerous advantages.

Solar dynamic power generators have been discussed in Wallin et al., NASA Contractor Report No. 180877, "Solar Dynamic Power System Definition Study," Mar. 1988, prepared for Lewis Research Center under contract NAS3–24864. The above study compares various theoretical solar dynamic systems using established concentrators, receivers, radiators and power conversion technologies. Among the heat engines incorporated in these solar dynamic systems are Brayton, Rankine, pumped-loop Stirling, and heat pipe Stirling cycle engines.

The receiver in the system discussed in the NASA study comprises one of various thermal eutectic salts, and the working fluid is an inert gas such as Helium/Xenon.

The systems proposed in the study have several practical disadvantages. The receiver of the study uses eutectic salts which make up the receiver cavity to directly absorb the concentrated solar radiation. This method of absorption limits the maximum operating temperature of the working fluid and thus also limits the efficiency of the heat engine which converts the absorbed energy to power. Moreover, because the walls of the receiving space absorb the concentrated solar energy, an increase in temperature of these systems would also cause an increase in radiant energy loss from the receiving space.

It is therefore an object of the present invention to provide a receiver for a solar dynamic power system in which a significant portion of the energy input is absorbed directly by the heat engine working fluid which circulates through the receiver cavity.

It is a further object of the present invention to provide a receiver for a solar dynamic power system in which radiant energy loss from the receiver space is prevented.

Another object of the present invention is to provide a receiver for a solar dynamic power system which eliminates hot spots due to aiming errors in the concentrator of the power system.

A still further object of the present invention is to provide a receiver with the smallest possible volume.

Yet another object of the present invention is to provide a receiver which makes it possible to operate at a given turbine operating temperature, for example, with smaller temperature gradients in both the thermal energy storage portion and the receiver.

It is also an object of the present invention to provide a complete solar dynamic power system of improved power efficiency incorporating the receiver of the present invention.

An additional object of the present invention is to provide a complete solar dynamic power system of increased reliability which is easily protected from an external threat.

SUMMARY OF THE INVENTION

In accordance with the above objects, there has been provided a receiver for a solar dynamic power generator having a heat cycle engine to generate power. The receiver comprises a working fluid including a radiant energy absorber selected from halogens and interhalogens. The receiver also comprises a hollow, cylindrical containment for containing the working fluid having a first end, a second end and an inner wall. A hollow, cylindrical member, is disposed within the containment. The cylindrical member has an inner wall and an outer wall, and defines a toroidal working fluid flow space within the containment and a receiving space within the inner wall of the cylindrical member. A window is disposed in the first end of the containment for admitting solar radiation in the receiving space and heating working fluid contained in the receiving space. The heated working fluid in the receiving space travels toward the first end of the containment. A latent heat storing material is disposed in the flow space between the outer wall of the cylindrical member and the inner wall of the containment for storing heat absorbed by the working fluid in the receiving space. Means are provided for coupling the working fluid with a heat engine, wherein, at the end of the heat cycle, the working fluid is reintroduced into the receiving space toward the second end of the containment.

In accordance with a preferred embodiment of the present invention there has been provided a solar dynamic power generator. The system comprises a working fluid including a radiant energy absorber selected from halogens and interhalogens. A hollow, cylindrical containment is provided for containing the working fluid, having a first end, a second end and an inner wall. A hollow, cylindrical axle member, is rotatably disposed within the containment. The axle member has an inner wall, and an outer wall, and defines a working fluid flow space between the outer wall of the axle member and the inner wall of the cylindrical containment. The axle member also defines a receiving cavity within the inner wall of the cylindrical member. A window is disposed in the first end of the containment for admitting solar radiation into the receiving cavity. The solar radiation is then absorbed by and heats the working fluid contained in the receiving space. The heated working fluid in the receiving space flows toward the first end of the containment and into the flow space. A latent heat storing material is disposed in the flow space for storing heat absorbed by the working fluid in the receiving cavity. A turbine is connected to the axle member and is disposed downstream with respect to the working fluid of the latent heat storing material. A flow of working fluid from the first toward the second end of the containment in the flow space causes the turbine and axle to rotate. Heat sink means are disposed downstream of the turbine, for eliminating waste heat from the working fluid. Compressor means are disposed downstream of the heat sink means for compressing the working fluid and introducing the compressed working fluid into the receiving cavity. Generator means are provided for converting the rotation of the turbine and axle member into electrical power. Means are also provided for coupling the axle member to the generator means.

Also in accordance with the above objects, there has been provided a solar dynamic power generating process having a light cycle and a dark cycle.

The light cycle comprises the step of i. irradiating and heating a working fluid comprising an inert gas and a radiant energy absorber selected from halogens and interhalogens with solar radiation in a receiving space. Thereafter, the light cycle comprises step ii., directing the working fluid into a flow space concentric with and surrounding the receiving space. Step iii. is storing heat from the irradiated and heated working fluid in a latent heat storage material disposed in the flow space. Step iv. is coupling the heated and irradiated working fluid with a heat engine, whereby power is generated. Step v. is reintroducing the working fluid into the receiving space after the fluid has been used to generate power.

The dark cycle comprises the step of i. heating said working fluid with energy stored in the latent heat storage material during the light cycle. Step ii. of the dark cycle is coupling the heated working fluid with a heat engine, whereby power is generated. Step iii. is introducing the working fluid into the receiving space after the fluid has been used to generate power. Step iv. of the dark cycle is directing the working fluid into the flow space concentric with and surrounding the receiving space.

The above-described process preferably further comprise the steps of: a. driving a turbine with the working fluid, whereby torque is produced; b. removing waste heat from the working fluid after driving the turbine, whereby cooled working fluid is produced; c. compressing the cooled working fluid if step b using the torque produced in step a; and d. generating electricity with the torque of step a.

Further objects, features and advantages of the present invention will become apparent from the description of the preferred embodiment which follows, when considered in conjunction with the attached figures of drawing.

DETAILED DESCRIPTION OF THE PREFERRED EMBODIMENTS

Figure 1:
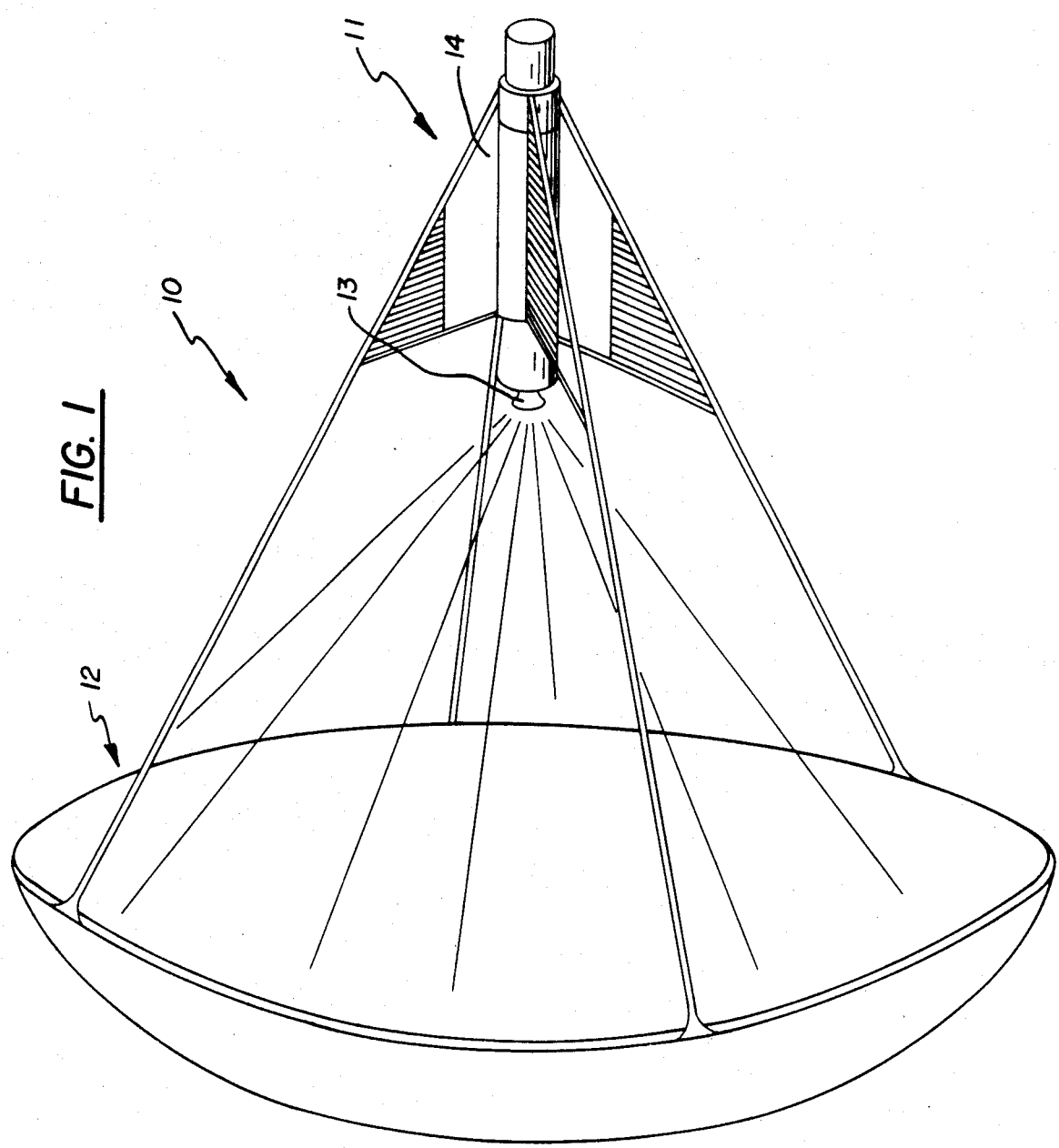
FIG. 1 shows a solar dynamic power generator according to the present invention with an accompanying solar collector.

In accordance with the present invention, a significant part of the radiation input to the receiver is absorbed directly by the heat engine working fluid which circulates through the receiver cavity. The working fluid consists of a mixture of inert gases plus an absorber gas, which can be a halogen such as bromine, none of which radiate energy under these conditions. The insulating properties of the fluid and its flow rate through the cavity result in a much higher ratio of fluid operating temperature to cavity surface temperature than if the cavity surfaces were heated directly by absorbed radiation. This mitigates receiver radiation losses which limit the gains that can otherwise be achieved by the effect of higher fluid operating temperatures on the efficiency of heat engines.

In accordance with the preferred embodiment of the invention, the receiver can be integrated with thermal energy storage, heat engine, recuperator, waste heat radiator, and alternator/generator modules to give a complete solar dynamic power system having significant advantages in compactness and weight/power ratio These advantages result both from the power efficiency associated with higher temperature operation and from the compact, cylindrically symmetrical geometry made possible by the rapid heat transport out of the receiver cavity. The simplicity of the overall system increases its inherent reliability and facilitates protection from external threat.

Reference is now made to the attached figures in which like parts are identified by like reference numerals.

FIG. 1 shows an integrated solar dynamic power system 10 in which a collector 12, a large parabolic reflector, focuses solar radiation into receiver aperture inlet cone 13 at a first end of a cylindrical containment vessel 11. Except for heat sink means shown in the drawing as waste heat radiators 14, the modules associated with the receiver are integrated in cylindrical containment 11. The receiver containment vessel 11 and waste heat radiators 14 ar oriented to minimize the shadow on the collector 12. The embodiment in FIG. 1 is suitable for either space or terrestrial applications. Alternatives for disposing of waste heat are also possible.

Figure 2:
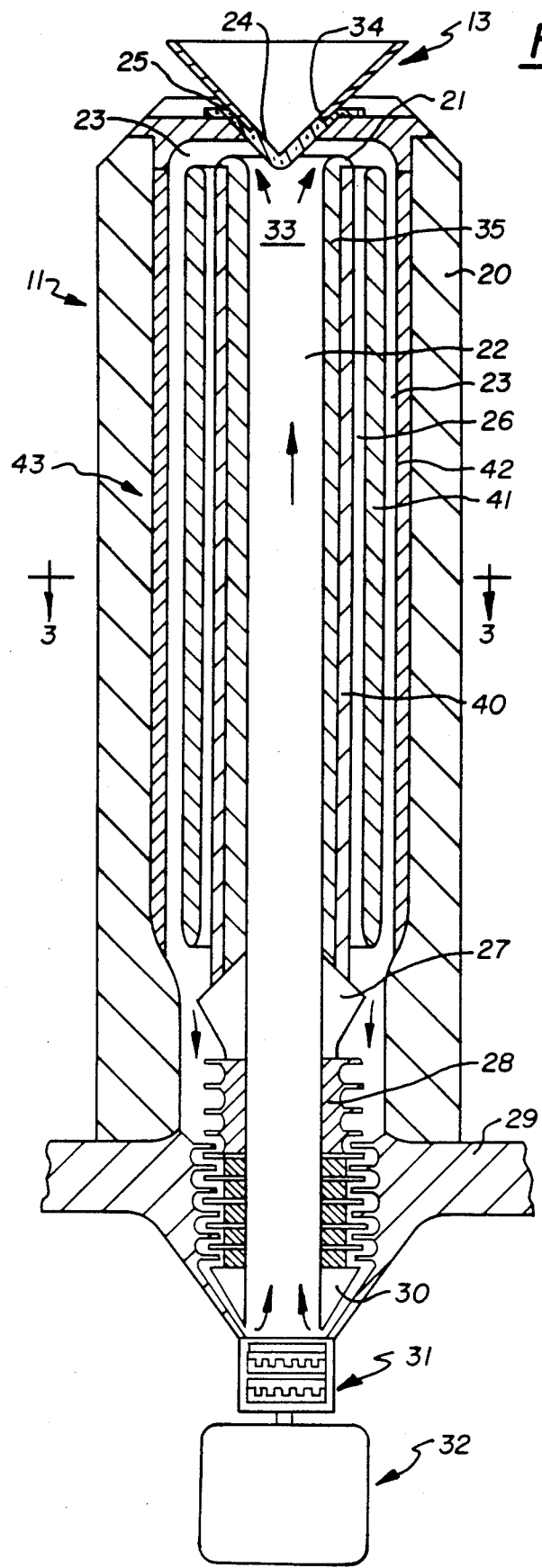
FIG. 2 shows a lengthwise cross section of the solar dynamic power generator of the present invention.

FIG. 2 shows a lengthwise cross section of the modules in the cylindrical containment vessel 11. A hollow turbine axle 21 is rotatably disposed on the axis of the cylindrical containment 11. Axle 21 serves as a conduit for return gas flow to receiving space or cavity 22 and the inner wall 35 of the axle 21 absorbs a portion of the input radiation not absorbed by the working fluid. The working fluid follows a annular path up the turbine axle 21 toward entry window 24, and into flow space between the axle 21 and wall 20 of the containment vessel 11. Wall 20 may be insulated to minimize thermal energy loss.

Radiation enters the vessel 11 through highly reflective entry cone 13 which mitigates energy losses and unwanted how spots due to errors in orienting the parabolic collector 12 with respect to the sun. Quartz or sapphire entry window 24 which allows radiation to pass into the receiver cavity 22, has a conical shape with the apex of the cone directed into the receiver cavity 22, minimizing reflection losses and allowing the entire window surface to be swept by working fluid flowing through the receiver cavity 22. The edges 34 of the entry window 24 extend beyond the opening in the entry cone 13 to minimize the exposure of the window seal 25 to thermal and radiation stress.

A significant part of the solar radiation that enters the receiver is absorbed by the halogen absorber constituent of the working fluid in a portion 33 of the receiver cavity 22 near the window 24. The absorber constituent is selected to absorb radiant energy in the widest possible spectrum while remaining opaque in the infra-red region. The unabsorbed radiation is transmitted to the wall 35 the turbine axle 21 where its energy is first absorbed by the wall 35, then transferred to the working fluid, preheating the fluid as it enters the receiver cavity 22. Absorption by the working fluid and rotation of the turbine axle 21 combine to prevent the effect of hot spots that might result from aiming errors. This allows the total receiver volume to be smaller than would otherwise be necessary.

After the working fluid is heated in the receiver cavity, it passes into flow space 23 between the axle 21 and the inner wall 20 of containment 11. The flow space 23 is divided into annular spaces 23, 26. The annular spaces 23, 26 are surrounded by sealed chambers 40, 41, 42 filled with fused salts which can store energy as latent heat of fusion. The geometry of the flow space is chosen to optimize surface area for heat transfer relative to the volume in which energy is stored and the volume through which the fluid flows. The chambers 40, 41, 42 together define a thermal energy storage module 43. The thermal energy storage module 43 is used to transfer heat between the working fluid and chambers 40, 41, 42 filled with partially molten salt, and has the same heat transfer rate at a given temperature difference. This configuration more than doubles the heat transfer efficiency of the same volume of heat storage material over that of designs using one wall of the thermal energy storage containment as the radiation receiver. This makes it possible to sustain a given turbine operating temperature with smaller temperature gradients in both the thermal energy storage module 43 and the receiving cavity 22. The operating temperature at which the working fluid leaves the lower portion of the energy storage module 43 and enters the heat engine is maintained at the temperature of the molten salt. During a dark cycle, heat is removed from thermal energy storage, starting at the top, where the fluid enters from the receiving cavity 22. The heat is replenished during the light cycle in which solar energy enters the receiving cavity 22.

Figure 3:
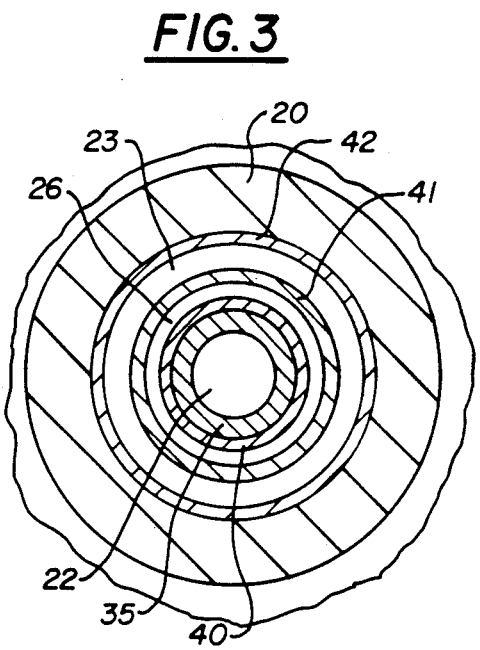
FIG. 3 shows a cross section along the line 3—3 of FIG. 2.

FIG. 3 shows a cross section along the line 3—3 of FIG. 2. The concentric relationship between receiving cavity 22 and annular spaces 23, 26 can easily be seen in FIG. 3.

After passing through the annular spaces 23, 26 the working fluid enters the heat engine, shown in FIG. 2 as a Brayton cycle engine which includes a gas turbine 27, recuperative heat exchanger 28 which transfers unusable heat to the working fluid returning to the receiving cavity 22, a waste heat exchanger 29 and a compressor 30, which together establish the necessary flow conditions. Waste heat exchanger 29 can be connected to waste heat radiators 14 shown in FIG. 1, or any other suitable heat sink means. The thermal energy of the flowing gas is converted by turbine 27 to rotational energy of the turbine axle 21. The axle 21 is coupled by a magnetic coupling 31, or other mechanism which preserves the hermetically sealed containment, to a suitable generator or alternator 32 which converts the rotational energy to electrical power.

The invention primarily concerns the receiver of a solar dynamic system. The preferred embodiment, described above, shows specifically how the receiver can be integrated with other necessary modules of a complete system in an overall architecture having advantages that accrue from the receiver concept. Although specific embodiments of the present invention have been described in the above specification, one skilled in the technology will recognize departures that may be made within the scope of the present invention which is solely determined by the appended claims.

What is claimed is:

1. A receiver for a solar dynamic power generator having a heat cycle engine to generate power, comprising:

a working fluid comprising a radiant energy absorber selected from halogens and interhalogens;

a hollow, cylindrical containment for containing the working fluid having a first end, a second end and an inner wall;

a hollow, cylindrical member, disposed within the containment having an inner wall and an outer wall, and defining a annular working fluid flow space within the housing and a receiving space within the inner wall of the cylindrical member;

a window disposed in the first end of the containment for admitting solar radiation in the receiving space for heating working fluid contained in the receiving space, wherein the heated working fluid in the receiving space travels toward the first end of the containment;

a latent heat storing material disposed in the flow space between the outer wall of the cylindrical member and the inner wall of the containment for storing heat absorbed by the working fluid in the receiving space; and means for coupling the working fluid with a heat engine, wherein, at the end of the heat cycle, the working fluid is reintroduced into the receiving space toward the second end of the containment.

2. A receiver according to claim 1, wherein said latent heat storing material is a latent heat eutectic salt.

3. A receiver according to claim 1, wherein said absorber is selected from chlorine, bromine, and interhalogens of bromine and chlorine.

4. A receiver according to claim 3, wherein said working fluid further comprises an inert gas.

5. A receiver according to claim 2, wherein said wherein said latent heat storing material comprises a plurality of substantially concentric cylinders disposed between said cylindrical member and the inner wall of said containment.

6. A receiver according to claim 5, wherein said concentric cylinders comprise sealed chambers filled with latent heat eutectic salts.

7. A solar dynamic power generator, comprising:

a working fluid including a radiant energy absorber selected from halogens and interhalogens;

a hollow, cylindrical containment vessel for containing the working fluid having a first end, a second end and an inner wall;

a hollow, cylindrical axle member, rotatably disposed within the containment vessel, having an inner wall and an outer wall, defining a working fluid flow space between the outer wall of the axle member and the inner wall of the cylindrical containment and defining a receiving cavity within the inner wall of the cylindrical member;

a window disposed in the first end of the containment vessel for admitting solar radiation into the receiving space for heating working fluid contained in the receiving space, wherein the heated working fluid in the receiving space flows toward the first end of the containment vessel and into the flow space;

a latent heat storing material disposed in the flow space for storing heat absorbed by the working fluid in the receiving space;

a turbine connected to the axle member and disposed downstream with respect to the working fluid of the latent heat storing material, wherein a flow of working fluid from the first to the second end of the flow space causes the turbine and axle to rotate;

heat sink means disposed downstream of the turbine, for eliminating waste heat from the working fluid;

compressor means disposed downstream of the heat sink means for compressing the working fluid and introducing the compressed working fluid into the receiving cavity;

generator means for converting the rotation of said turbine and axle member into electrical power; and means for coupling the axle member to said generator means.

8. A generator according to claim 7, wherein said latent heat storing material is a latent heat eutectic salt.

9. A generator according to claim 7, wherein said absorber is selected from chlorine, bromine, and interhalogens of bromine and chlorine.

10. A generator according to claim 9, wherein said working fluid further comprises an inert gas.

11. A generator according to claim 9, wherein said latent heat storing material comprises a plurality of concentric cylinders disposed between said cylindrical member and the inner wall of said containment vessel.

12. A receiver according to claim 11, wherein said concentric cylinders comprise sealed chambers filled with latent heat eutectic salts.

13. A solar dynamic power generating process having
A. a light cycle comprising the steps of:
  i. irradiating and heating a working fluid comprising an inert gas and a radiant energy absorber selected from halogens and interhalogens with solar radiation in a receiving space;
  ii. directing the working fluid into a flow space concentric with and surrounding the receiving space;
  iii. storing heat from the irradiated and heated working fluid in a latent heat storage material disposed in the flow space;
  iv. coupling the heated and irradiated working fluid from the heat storage material with a heat engine, whereby power is generated;
  v. reintroducing the working fluid into the receiving space after the fluid has been used to generate power; and
B. a dark cycle comprising the steps of:
  i. heating said working fluid with energy stored in the latent hat storage material during the light cycle;
  ii. coupling the heated working fluid with a heat engine, whereby power is generated;
  iii. introducing the working fluid into the receiving space after the fluid has been used to generate power; and
  iv. directing the working fluid into the flow space concentric with and surrounding the receiving space.

14. A process according to claim 13, wherein the step of coupling the heated working fluid with a heat engine in the light and dark cycles further comprises the steps of:
  a. driving a turbine with the working fluid, whereby torque is produced;
  b. removing waste heat from the working fluid after driving the turbine, whereby cooled working fluid is produced;
  c. compressing the cooled working fluid if step b using the torque produced in step a;
  d. generating electricity with the torque of step a.

15. A process according to claim 14, further comprising the step, after step a, of recuperating heat from the flow space to the receiving space.

* * * * *